(12) United States Patent
Sasaki et al.

(10) Patent No.: US 7,195,192 B2
(45) Date of Patent: Mar. 27, 2007

(54) TAPE CARTRIDGE

(75) Inventors: Morimasa Sasaki, Tokyo (JP); Takateru Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 326 days.

(21) Appl. No.: 10/860,127

(22) Filed: Jun. 4, 2004

(65) Prior Publication Data

US 2005/0006515 A1 Jan. 13, 2005

(30) Foreign Application Priority Data

Jun. 5, 2003 (JP) ............................ 2003-160822

(51) Int. Cl.
*G11B 23/07* (2006.01)
(52) U.S. Cl. .................... 242/348.2; 360/132
(58) Field of Classification Search ............. 242/348.2; 360/132
See application file for complete search history.

(56) References Cited

U.S. PATENT DOCUMENTS 6,236,539 B1 * 5/2001 Morita et al. ............... 360/132
6,648,259 B1 * 11/2003 Shiga et al. ............. 242/348.2

FOREIGN PATENT DOCUMENTS

| JP | 2000-260156 | 9/2000 |
|---|---|---|
| JP | 2001-319457 | 11/2001 |
| JP | 2003-203455 | 7/2003 |
| JP | 2003-203458 | 7/2003 |

OTHER PUBLICATIONS

English language Abstract of JP 2000-260156.
English language Abstract of JP 2001-319457.
English language Abstract of JP 2003-203455.
English language Abstract of JP 2000-203458.

* cited by examiner

*Primary Examiner*—John Q. Nguyen
(74) *Attorney, Agent, or Firm*—Greenblum & Bernstein, P.L.C.

(57) ABSTRACT

A tape cartridge includes a leader pin that is fixed to an end of a magnetic tape, a case main body that is composed of an upper case and a lower case, has a tape withdrawal opening through which the magnetic tape can be withdrawn formed in a side surface thereof, and has leader pin storage parts capable of respectively storing an upper end and a lower end of the leader pin formed in the upper case and the lower case in a vicinity of the tape withdrawal opening, and a spring member that is disposed in the case main body, regulates movement of the leader pin by having contact surfaces thereof contact or be near to side surfaces of both the end parts of the leader pin that are stored in the leader pin storage parts, and elastically deforms when the leader pin is withdrawn to stop regulating the movement. The contact surfaces of the spring member are curved towards central parts thereof so as to project towards the side surfaces.

1 Claim, 12 Drawing Sheets

TAPE CARTRIDGE

BACKGROUND OF THE INVENTION

1. Field of the Invention

The present invention relates to a single reel-type tape cartridge where a single tape reel, on which a magnetic tape is wound, is rotatably held in a case main body.

2. Description of the Related Art

A magnetic tape cartridge disclosed by Japanese Laid-Open Patent Publication No. 2000-260156 is known as one example of this kind of tape cartridge. This magnetic tape cartridge is a single reel-type cartridge recording medium, and is constructed of a cartridge case and a reel around which a magnetic tape is wound. In this case, a cylindrical leader pin for withdrawing the magnetic tape from the cartridge case is fixed to an end of the magnetic tape.

The cartridge case is constructed by fitting together an upper case and a lower case and encloses the reel in a rotatable state. In this case, cutaway parts that compose an opening for withdrawing the magnetic tape are respectively formed in the side surfaces of the upper case and the lower case. In the vicinity of the opening in the upper case and the lower case, storage parts for storing fixed parts formed at both ends of a leader pin are formed. Also, in a vicinity of the opening in the cartridge case, there is provided a locking member that regulates the movement of the leader pin by having end engaging parts thereof contact (or be close to) the fixed parts.

In this magnetic tape cartridge, in a state where the magnetic tape is wound on the reel (the "unused state"), the fixed parts of the leader pin that is fixed to the end of the magnetic tape are respectively stored in the storage parts and the end engaging parts of the locking member contact the fixed parts. In this way, movement of the leader pin is regulated.

On the other hand, when the magnetic tape cartridge has been loaded in a recording/reproducing apparatus, for example, a tape withdrawing member of the recording/reproducing apparatus engages the leader pin and withdraws the leader pin from the opening in the cartridge case. At this time, while the fixed parts of the leader pin push back the end engaging parts of the locking member against the pressing force of the end engaging parts (i.e., against the elastic force of the locking member), the fixed parts are pulled out of the storage parts against friction caused by side surfaces of the fixed parts sliding against contact surfaces of the end engaging parts. Next, a reel in the recording/reproducing apparatus starts to wind the magnetic tape and recording or reproduction of data is carried out by a recording/reproducing unit of the recording/reproducing apparatus. After this, when recording or reproduction has ended, the recording/reproducing apparatus rotates the reel of the magnetic tape cartridge to rewind the magnetic tape. Next, when the rewinding of the magnetic tape is almost complete, the rewinding of the magnetic tape causes the fixed parts of the leader pin to push back against the pressing force of the end engaging parts of the locking member and the fixed parts are pulled back into the storage parts against friction caused by the side surfaces of the fixed parts sliding against the contact surfaces of the end engaging parts. After this, the fixed parts are stored in the storage parts and the end engaging parts contact the fixed parts. In this way, the movement of the leader pin is regulated.

However, by investigating the tape cartridge described above, the present inventors discovered the following problem. That is, in tape cartridges including the conventional tape cartridge described above, as shown in FIGS. 20 and 21, contact surfaces 82 of engaging parts (end engaging parts) of a spring member (locking member) 81 are normally formed as flat surfaces (i.e., surfaces that are straight in the up-down direction). In this case, when the leader pin 83 is withdrawn and pulled back in, there is surface contact or linear contact between the contact surfaces 82 of the spring member 81 and the end parts (fixed parts) 84 of the leader pin 83. Also, to make it possible for the leader pin 83 to move smoothly in this type of tape cartridge, the length of the leader pin 83 is set slightly shorter than the distance of separation between the upper case (not shown) and the lower case 86. This means that as shown in FIGS. 20 and 21, when the tape is wound out and rewound, the leader pin 83 moves up and down by an amount equal to the above difference in lengths, so that the contact surface area or contact length between the contact surfaces 82 of the spring member 81 and the side surfaces 85 of the end parts 84 of the leader pin 83 fluctuates and the contact positions between the surfaces 82 and 85 vary. Accordingly, in a conventional tape cartridge, due to fluctuations in the contact surface area or contact length between the contact surfaces 82 and the side surfaces 85 and the variation in the contact positions, the friction due to the sliding of both surfaces, for example, fluctuates, so that in reality the force (hereinafter also referred to as the "attaching/detaching force") required to withdraw and pull back in the leader pin 83 against the pressing force and friction described above also fluctuates, which causes other problems.

More specifically, for this kind of tape cartridge, to stabilize the operation when the recording/reproducing apparatus withdraws and pulls back in the leader pin 83, for example, upper and lower limits are set for the attaching/detaching force. This means that when the spring member 81 for this kind of tape cartridge is designed, the upper and lower limits (tolerance) for the pressing force of the spring member 81 are set (calculated) based on the upper and lower limits of the attaching/detaching force. However, in a conventional tape cartridge, due to the fluctuations in the attaching/detaching force caused by factors such as the fluctuations in the contact surface area or contact length between the contact surfaces 82 and the side surfaces 85 and the variation in the contact positions during use, it is necessary to set the tolerance for the pressing force at a small value in anticipation of fluctuation in the attaching/detaching force. Accordingly, in a conventional tape cartridge, it is necessary to machine the spring member 81 with a higher precision corresponding to how small the tolerance of the pressing force is, so that there is the problem of a high manufacturing cost for the spring member 81 and in turn a high manufacturing cost for the tape cartridge.

SUMMARY OF THE INVENTION

The present invention was conceived in view of the problem described above and it is a principal object of the present invention to provide a tape cartridge for which the manufacturing cost of the spring member can be reduced.

A tape cartridge according to the present invention includes: a single tape reel around which a magnetic tape is wound; a leader pin that is fixed to an end of the magnetic tape and used to withdraw the magnetic tape; a case main body that is composed of an upper case and a lower case that fit together, rotatably encloses the tape reel, has a tape withdrawal opening through which the magnetic tape can be withdrawn formed in a side surface thereof, and has leader pin storage parts capable of respectively storing an upper end and a lower end of the leader pin formed in the upper case and the lower case in a vicinity of the tape withdrawal opening; and a spring member that is disposed in the case main body, regulates movement of the leader pin by having contact surfaces thereof contact or be near to side surfaces of both the end parts of the leader pin that are stored in the leader pin storage parts, and elastically deforms when the leader pin is withdrawn to stop regulating the movement, wherein at least one surface, out of first surfaces that are the side surfaces of the end parts of the leader pin and second surfaces that are contact surfaces of the spring member corresponding to the first surfaces, is curved moving towards a central part thereof in an up-down direction thereof so as to project towards another surface out of the first surfaces and the second surfaces corresponding to the at least one surface.

In this tape cartridge, at least one surface, out of first surfaces that are the side surfaces of the end parts of the leader pin and second surfaces that are contact surfaces of the spring member corresponding to the first surfaces, is curved moving towards a central part thereof in an up-down direction thereof so as to project towards another surface out of the first surfaces and the second surfaces corresponding to the at least one surface. This means that regardless of how the leader pin is positioned in the up-down direction inside the case main body when the leader pin is withdrawn or pulled back in, central parts of the contact surfaces of the spring member in the width direction thereof can always make point contact with the side surfaces of the end parts of the leader pin, and as a result, the contact surface area of both surfaces and the contact part (contact position) where one of the surfaces contacts the other can always be kept approximately constant. Accordingly, it is possible to always keep the magnitude of the friction due to the sliding of both surfaces, for example, approximately constant, so that the fluctuation in the attaching/detaching force of the leader pin can be reduced, resulting in it being possible to set a large tolerance for the pressing force of the spring member. As a result, it becomes easy to machine the spring member, and a considerable reduction can be made in the manufacturing cost of the spring member, and in turn in the manufacturing cost of the tape cartridge.

By making the contact surfaces curved, when the leader pin is withdrawn and pulled back in, point contact is made between only the central parts of the contact surfaces and the side surfaces of the end parts of the leader pin, and the upper and lower edge parts (corner parts) of the contact surfaces are kept away from side surfaces. Accordingly, even if the leader pin or the spring members becomes tilted during the withdrawal or pulling back in of the leader pin due to a shock, for example, contact between the upper and lower corner parts of the contact surfaces and the side surfaces is very unlikely, so that damage to the side surfaces due to the corner parts sliding on the side surfaces can be prevented.

Here, it is preferable that the spring member corresponding to the first surface is formed of a strip-like elastic member and is constructed as the one surface that is curved. With this construction, bending in the width direction (upper direction) of the spring member can be suppressed, so that fluctuation in the pressing force of the spring member can be reduced.

Also, the spring member corresponding to the first surface can be formed of a wire-like elastic member that is circular or oval in cross-section and is constructed as the one surface that is curved. With this construction, since a bending process for a wire-like elastic member is comparatively easy compared to a bending process for a plate-like elastic member, the manufacturing cost of the spring member can be further reduced by a corresponding amount.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a tape cartridge according to the present invention will now be described with reference to the attached drawings.

Figure 1:
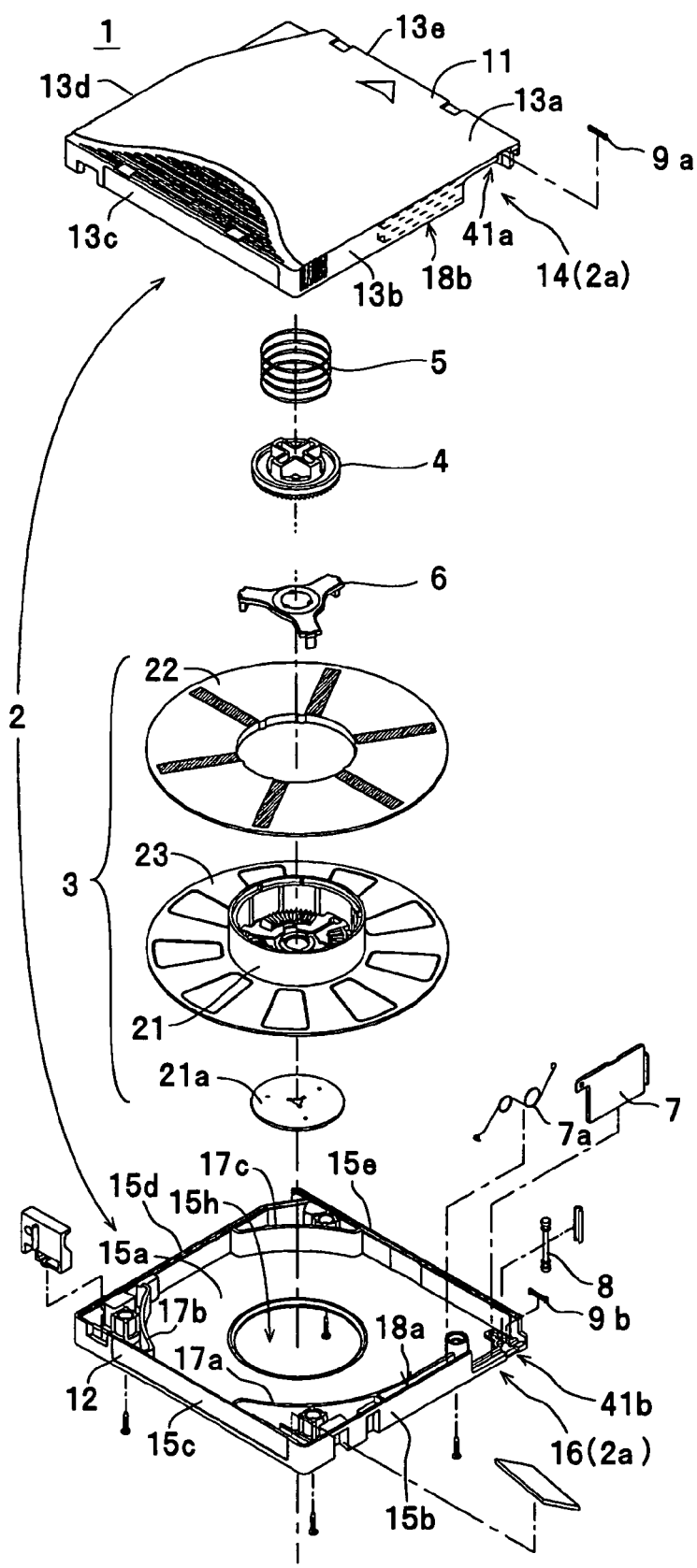
FIG. 1 is an exploded perspective view of a tape cartridge.

The tape cartridge 1 is a single reel-type cartridge recording medium used as a backup medium for recording data recorded on a main recording medium of an electronic computer, for example, and as shown in FIG. 1, includes a case main body 2, a tape reel 3, a locking member 4, a brake spring 5, a brake removing plate 6, a door member 7, a leader pin 8, and spring members 9a, 9b. It should be noted that a magnetic tape is wound around the tape reel 3, but for ease of understanding the construction of the various components, the magnetic tape has been omitted from the drawings of the present embodiment.

Figure 2:
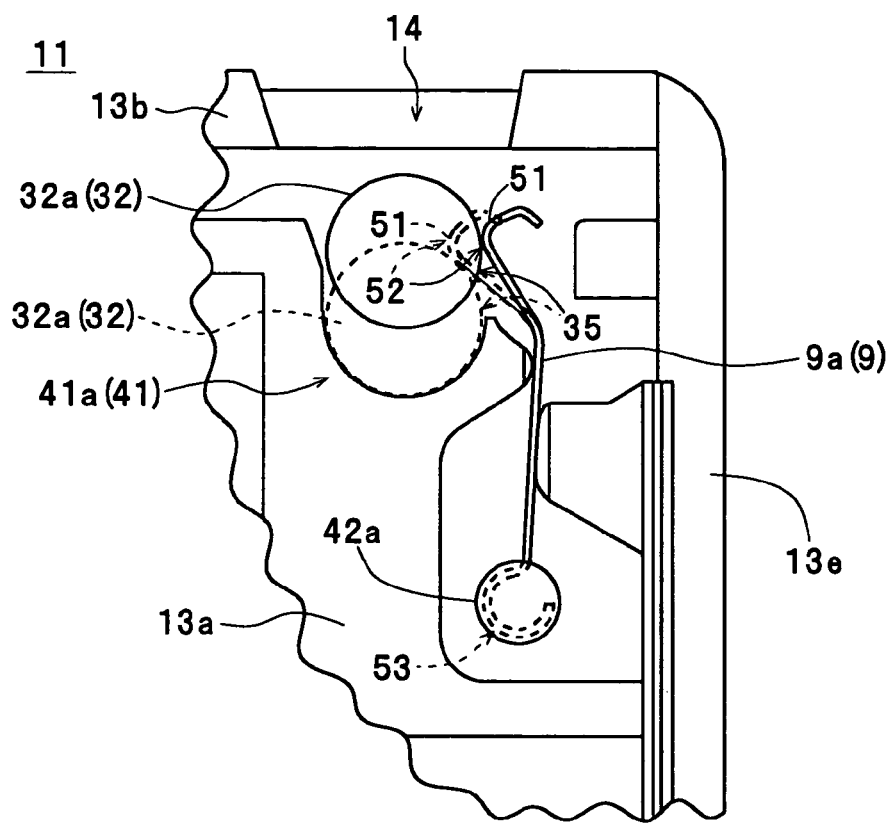
FIG. 2 is a plan view of a construction in a vicinity of a leader pin storage part in an upper case.

As shown in FIG. 1, the case main body 2 includes an upper case 11 and a lower case 12 that are respectively formed in the shape of shallow plates and can fit together. The case main body 2 rotatably encloses the tape reel 3 in an internal space formed when the upper case 11 and the lower case 12 are fitted together. The upper case 11 is integrally formed of resin with a square top plate 13a, four side plates 13b to 13e erected on the four edges of the top plate 13a, and arc-shaped partition walls (not shown) that form a storage compartment of the tape reel 3 inside the case main body 2. In this case, a cutaway part 14 composing a tape withdrawal opening 2a that makes it possible to withdraw the magnetic tape inside the case main body 2 to the outside is formed in the side plate 13b. A guide groove 18b that allows the door member 7 to slide is formed by the side plate 13b and a partition wall (not shown) that faces the side plate 13b. In addition, four guide protrusions (not shown) that permit up-down movement of the locking member 4 but restrict rotation thereof are erected in a central part of an inner surface of the top plate 13a. Also, a leader pin storage part 41a is formed in the top plate 13a in the vicinity of the cutaway part 14. In this case, as shown in FIG. 2, the leader pin storage part 41a is composed of a semicircular concave formed with an open part facing the cutaway part 14, with this concave storing an upper end 32a (see FIG. 6) of the leader pin 8. Also, as shown in FIG. 2, a cylindrical spring member supporting part 42a that supports a base end part 53 of a spring member 9a is formed in the top plate 13a in the vicinity of the leader pin storage part 41a.

Figure 3:
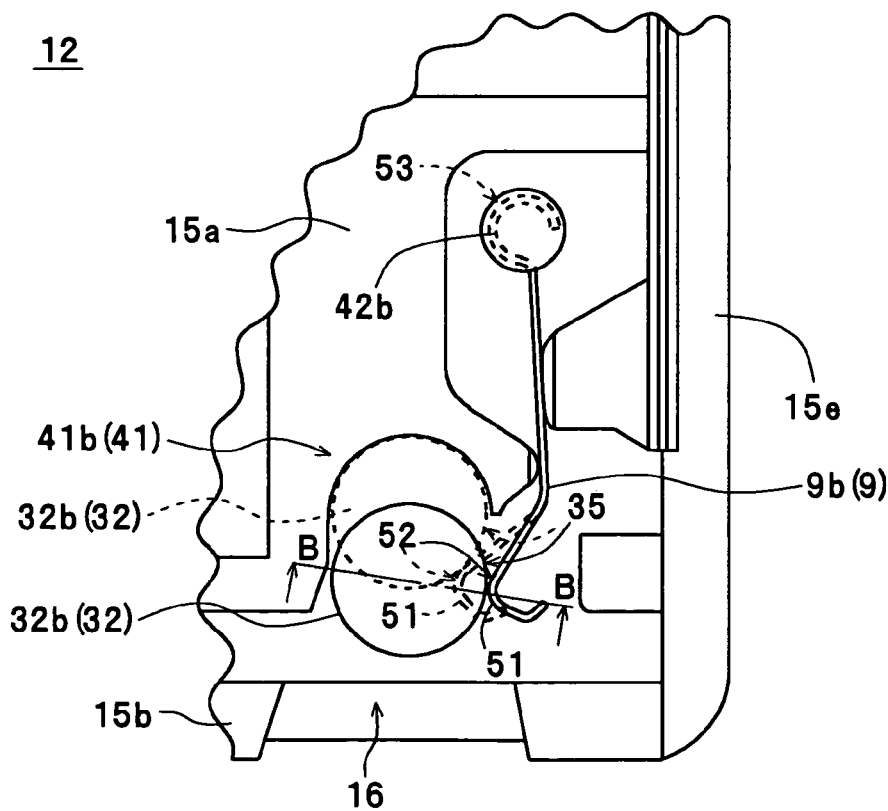
FIG. 3 is a plan view showing the construction in a vicinity of a leader pin storage part in a lower case.

As shown in FIG. 1, the lower case 12 is integrally formed of resin with a base plate 15a, side plates 15b to 15e erected on the four edges of the top plate 15a, and three partition walls 17a to 17c that in concert with the partition walls of the upper case 11 form the storage compartment of the tape reel 3. In this case, a circular insertion hole 15h through which a drive shaft (not shown) of a recording/reproducing apparatus can be inserted is formed in the base plate 15a. A cutaway part 16 that in concert with the cutaway part 14 of the upper case 11 forms the tape withdrawal opening 2a is formed in the side plate 15b. Also, a guide groove 18a that allows the door member 7 to slide is formed by the side plate 15b and the partition wall 17a. A leader pin storage part 41b is also formed in the base plate 15a in the vicinity of the cutaway part 16. In this case, as shown in FIG. 3, the leader pin storage part 41b is composed of a semicircular concave formed with an open part facing the cutaway part 16, with this concave storing a lower end 32b (see FIG. 6) of the leader pin 8. Also, as shown in FIG. 3, a cylindrical spring member supporting part 42b that supports the base end part 53 of the spring member 9b is formed in the base plate 15a in the vicinity of the leader pin storage part 41b.

As shown in FIG. 1, the tape reel 3 includes a hub 21, an upper flange 22, and a lower flange 23. The hub 21 is formed in the shape of a bottomed cylinder around which the magnetic tape can be wound, with the lower flange 23 being integrally formed with a lower end of the hub 21. Toothed parts that can engage the locking member 4 which is energized by the brake spring 5 are formed on an inner surface of a base plate of the hub 21, and a metal plate 21a for attaching the drive shaft of the recording/reproducing apparatus to the tape reel 3 by suction is attached to an outer surface of the base plate. In addition, three through-holes for attachment to the brake removing plate 6 in a state where the brake removing plate 6 can move up and down are provided in a base plate of the hub 21. A circular through-hole through which the locking member 4 and the brake removing plate 6 can be inserted is formed in a center of the upper flange 22 and the upper flange 22 is welded to the upper edge of the hub 21. As shown in FIG. 1, the door member 7 is formed as a thin plate that can close the tape withdrawal opening 2a, and is stored together with a spring 7a in the guide groove 18b of the upper case 11 and the guide groove 18a of the lower case 12. In this case, the door member 7 is caused to slide along the side plates 13b, 15b by the recording/reproducing apparatus to open the tape withdrawal opening 2a.

Figure 6:
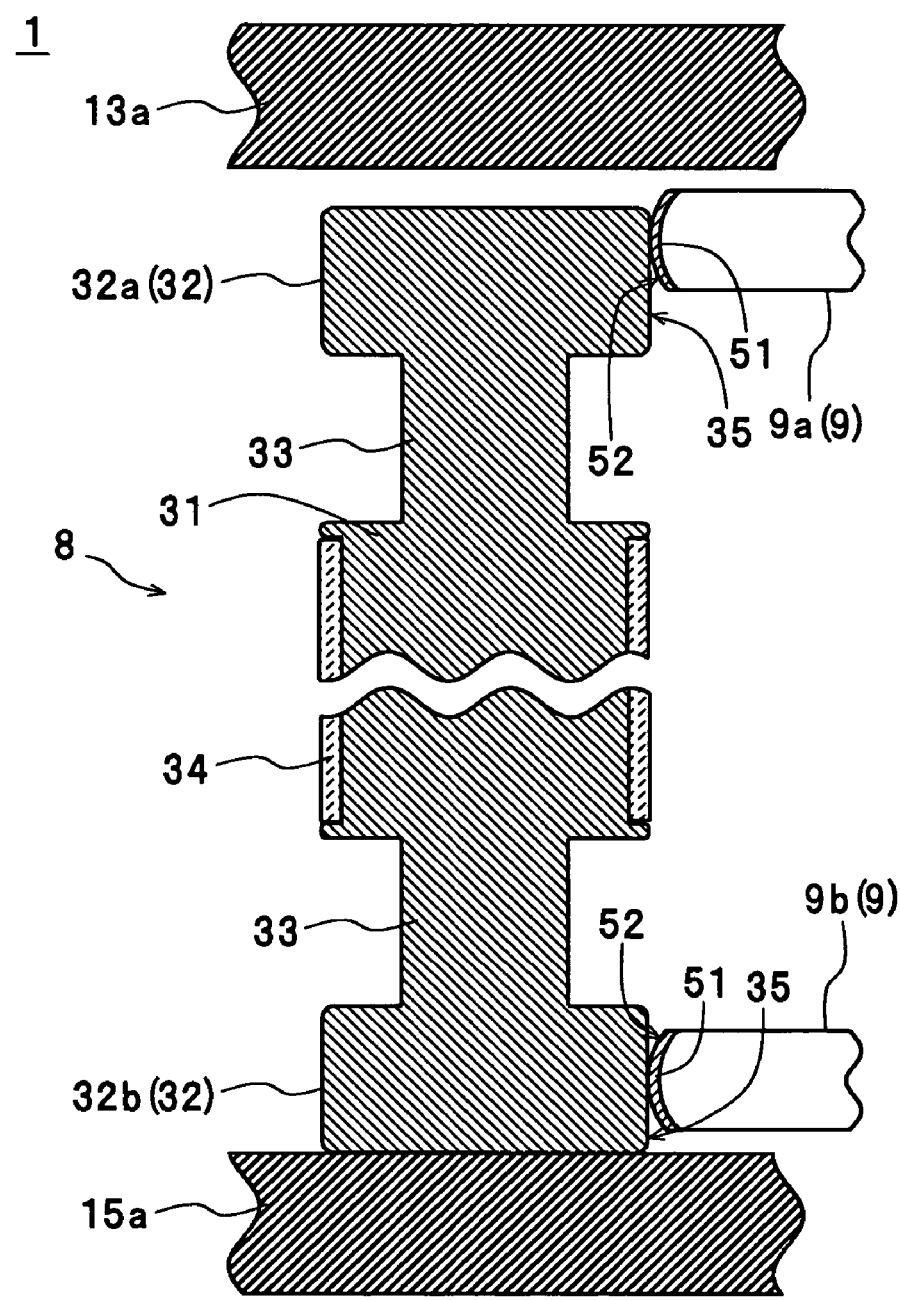
FIG. 6 is a cross-sectional view (along the line B—B in FIG. 3) showing the contact between a leader pin and the spring members in a state where a lower end surface of the leader pin contacts the base plate.

As shown in FIG. 6, the leader pin 8 is composed of the fixing part 31 that is fixed to the end of the magnetic tape, an upper end part 32a and a lower end part 32b (hereinafter also referred to simply as the "end parts 32" when no distinction is required) that are respectively stored in the leader pin storage parts 41a, 41b (hereinafter also referred to as the "leader pin storage parts 41" when no distinction is required), and engaging parts 33, 33 that engage a tape withdrawing member (not shown) of the recording/reproducing apparatus, and is formed in an overall cylindrical shape.

In this case, the leader pin 8 is fixed to the magnetic tape by fitting the fixing part 31, around which the end of the magnetic tape has been wound, into a fixing member 34. Also, in a state where the magnetic tape is wound around the tape reel 3 (the unused state), the leader pin 8, as shown by the broken lines in FIGS. 2, 3, the end parts 32, 32 of the leader pin 8 are respectively stored in the concaves of the leader pin storage parts 41, 41 and side surfaces 35 of the end parts 32, 32 are pressed (contacted) by contact surfaces 52, 52 of engaging parts 51, 51 of the spring members 9a, 9b (hereinafter also referred to as the "spring members 9" when no distinction is required), so that movement of the leader pin 8 is restricted within the leader pin storage parts 41, 41. Also, when the tape cartridge 1 has been loaded in the recording/reproducing apparatus, the leader pin 8 is engaged by the tape withdrawing member (not shown) of the recording/reproducing apparatus and is withdrawn from the tape withdrawal opening 2a to outside the tape cartridge 1 (inside the recording/reproducing apparatus).

Figure 4:
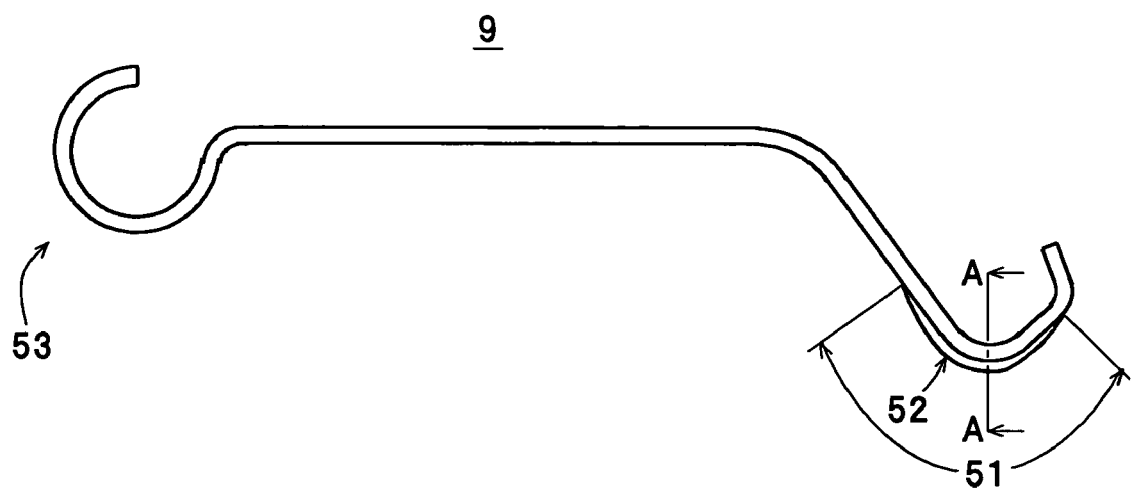
FIG. 4 is a plan view showing a spring member.
Figure 5:
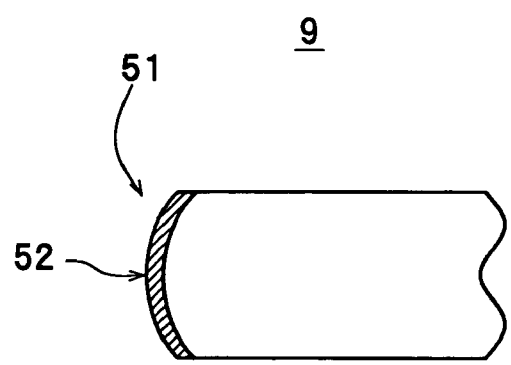
FIG. 5 is a cross-sectional view taken along the line A—A in FIG. 4.

As shown in FIGS. 4 to 6, the spring members 9 are composed of the engaging parts 51 that face the side surfaces 35 of the end parts 32 of the leader pin 8 in a state where the leader pin 8 is inside the case main body 2, and the base end parts 53 that are respectively supported by the spring member supporting part 42a of the upper case 11 and the spring member supporting part 42b of the lower case 12. The spring members 9 are formed by bending strip-like elastic members into predetermined shapes, for example. In this case, as shown in FIG. 5, the contact surfaces 52 of the engaging parts 51 are formed as overall curved surfaces so that moving towards a center (a central part) in the width direction (an up-down direction in a state where the spring members 9 have been disposed in the case main body 2), the contact surfaces 52 gradually project towards the side surfaces 35 of the end parts 32 of the leader pin 8 (i.e., leftwards in FIG. 5). As shown by the broken lines in FIGS. 2 and 3, in a state where the end parts 32 of the leader pin 8 are stored in the leader pin storage parts 41, the contact surfaces 52 of the engaging parts 51 of the spring members 9 press on (contact) the side surfaces 35 of the end parts 32 with a predetermined pressing force (the elastic force of the spring members 9) to restrict movement of the leader pin 8. Also, when the leader pin 8 has been withdrawn towards the tape withdrawal opening 2a, as shown by the solid lines in FIGS. 2 and 3, the spring members 9 elastically deform towards the outside (the side surface 13e side or the side surface 15e side) due to the pulling force when the leader pin 8 is withdrawn so as to permit movement of the end parts 32 and thereby remove the restriction on the movement of the leader pin 8.

Next, the overall operation of the tape cartridge 1 will be described with reference to the drawings, focusing on the operation of the leader pin 8 and the spring members 9.

In the tape cartridge 1, when the magnetic tape is wound around the tape reel 3 (the unused state), as shown by the broken lines in FIGS. 2 and 3, the end parts 32, 32 of the leader pin 8 to which the end of the magnetic tape is fixed are respectively stored in the leader pin storage parts 41, 41, and in this state, the contact surfaces 52, 52 of the engaging parts 51, 51 of the spring members 9, 9 respectively press (contact) the side surfaces 35, 35 of the end parts 32, 32. By doing so, movement of the leader pin 8 is restricted by the leader pin storage parts 41, 41.

On the other hand, when the tape cartridge 1 has been loaded in the recording/reproducing apparatus (i.e., during use of the tape cartridge 1), the recording/reproducing apparatus slides the door member 7 to open the tape withdrawal opening 2a. Next, the tape withdrawing member of the recording/reproducing apparatus is inserted from the tape withdrawal opening 2a and engages the engaging parts 33 of the leader pin 8. Next, the recording/reproducing apparatus withdraws the leader pin 8 towards the tape withdrawal opening 2a. At this time, as shown by the solid lines in FIGS. 2 and 3, the end parts 32 of the leader pin 8 push back the engaging parts 51 outwards against the pressing force of the engaging parts 51 of the spring members 9 and the end parts 32 are withdrawn from the leader pin storage parts 41a, 41b against the friction caused by the side surfaces 35 and the contact surfaces 52 of the engaging parts 51 sliding against one another. In this way, the restriction on the movement of the leader pin 8 by the spring members 9, 9 is released.

In this case, as shown in FIG. 6, since the contact surfaces 52 of the engaging parts 51 of the spring members 9 are curved so that moving towards the central part of the contact surfaces 52 in the width direction, the contact surfaces 52 project towards the side surfaces 35 of the end parts 32, resulting in the central parts of the contact surfaces 52 in the width direction making point contact with the facing side surfaces 35 with a very small contact area.

Figure 7:
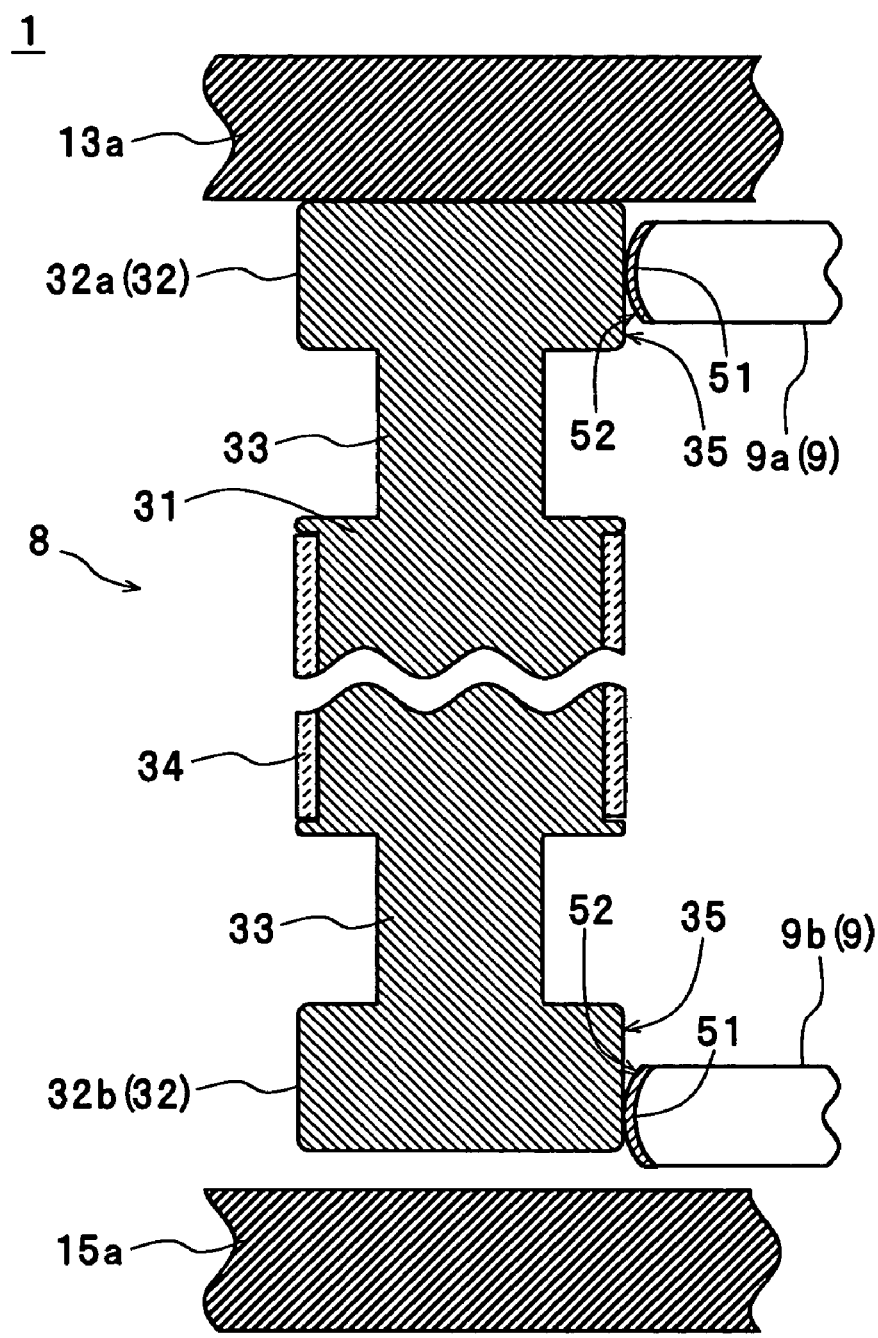
FIG. 7 is a cross-sectional view showing the contact between a leader pin and the spring members in a state where an upper end surface of the leader pin contacts the top plate.

Accordingly, as shown in FIG. 6, even if the leader pin 8 is withdrawn in a state where the leader pin 8 is positioned towards the bottom inside the tape cartridge 1 (a state where a lower end surface of the lower end part 32b contacts the base plate 15a), the central part of the contact surface 52 of the spring member 9a in the width direction makes point contact at an upper part of the side surface 35 of the upper end part 32a, and the central part of the contact surface 52 of the spring member 9b in the width direction makes point contact at a central part of the side surface 35 of the lower end part 32b. Also, as shown in FIG. 7, even if the leader pin 8 is withdrawn in a state where the leader pin 8 is positioned towards the top inside the tape cartridge 1 (a state where an upper end surface of the upper end part 32a contacts the top plate 13a), the central part of the contact surface 52 of the spring member 9a in the width direction makes point contact at a central part of the side surface 35 of the upper end part 32a, and the central part of the contact surface 52 of the spring member 9b in the width direction makes point contact at a lower part of the side surface 35 of the lower end part 32b. Accordingly, regardless of how the leader pin 8 is positioned inside the tape cartridge 1, the central parts of the contact surfaces 52 in the width direction always make point contact with the side surfaces 35 and the contact surface area between both surfaces and the contact positions of the contact surfaces 52 are always kept approximately constant, and since the magnitude of the friction caused by both surfaces sliding against each other, for example, is always kept approximately constant, there is a reduction in the fluctuation in the attaching/detaching force. Also, since the spring members 9 are formed of strip-like elastic members, bending in the width direction of the spring members 9 (the up-down direction) is suppressed, which results in reduced fluctuation in the pressing force of the spring members 9.

Next, a reel of the recording/reproducing apparatus pulls out and winds the magnetic tape from the tape withdrawal opening 2a while the recording/reproducing unit of the recording/reproducing apparatus records recording data onto the magnetic tape or reads recording data from the magnetic tape. After this, when the recording or reading of the recording data is complete, the recording/reproducing apparatus rotates the tape reel 3 to start the rewinding (winding back into the tape cartridge 1) of the magnetic tape. Next, when the rewinding of the magnetic tape is almost complete, the leader pin 8 is pulled back inside the case main body 2. At this time, while the end parts 32 of the leader pin 8 push back the engaging parts 51 of the spring members 9 against the pressing force of the spring members 9, the end parts 32 are pulled back into the leader pin storage parts 41 against the friction caused by the side surfaces 35 of the end parts 32. sliding against the contact surfaces 52 of the engaging parts 51. In this case, in the same way as the withdrawal operation described above, regardless of the positioning of the leader pin 8 in the up-down direction inside the tape cartridge 1 when the leader pin 8 is pulled back, central parts of the contact surfaces 52 of the engaging parts 51 in the width direction will always make point contact with the side surfaces 35 of the end parts 32 of the leader pin 8. Accordingly, since the contact surface area of both surfaces and the contact positions of the contact surfaces 52 are always kept approximately constant, the magnitude of the friction caused by the sliding of both surfaces, for example, is always kept constant, resulting in less fluctuation in the attaching/detaching force. Next, the end parts 32 of the leader pin 8 are stored in the leader pin storage parts 41 and the engaging parts 51 of the spring members 9 press on the end parts 32. By doing so, movement of the leader pin 8 in the leader pin storage parts 41, 41 is restricted.

It should be noted that a plurality of sets of the spring members of the conventional type where the contact surfaces of the engaging parts are formed as flat surfaces and the spring members 9 described above were respectively manufactured with equal tolerance for the pressing force thereof. The attaching/detaching force was then measured numerous times for tape cartridges in which these spring members are disposed while varying the position in the up-down direction of the leader pin 8 inside the tape cartridge. As a result, in tape cartridges in which the spring members of the conventional type were disposed, a maximum fluctuation of 0.4N was found in the measured attaching/detaching force. On the other hand, in tape cartridges in which the spring members 9 were disposed (i.e., in the tape cartridge 1), a maximum fluctuation of 0.25N was found in the measured attaching/detaching force. From the above results, it is clear that the fluctuation in the attaching/detaching force is reduced by forming the spring members 9 so that moving towards the centers (central parts) in the width direction of the contact surfaces 52 of the engaging parts 51, the contact surfaces 52 are curved so as to project towards the side surfaces 35 of the end parts 32.

In this way, according to the tape cartridge 1, by forming the spring members 9 so that moving towards the centers (central parts) in the width (up-down) direction of the contact surfaces 52 of the engaging parts 51, the contact surfaces 52 are curved so as to project towards the side surfaces 35 of the end parts 32 of the leader pin 8, it is possible to ensure that point contact is always made between the contact surfaces 52 of the engaging parts 51 of the spring members 9 and the central parts in the width direction of the side surfaces 35 of the end parts 32 of the leader pin 8 regardless of the position of the leader pin 8 in the up-down direction inside the tape cartridge 1 when the leader pin 8 is withdrawn or pulled back in, so that the contact surface area between the surfaces and the contact positions of the contact surfaces 52 with the side surfaces 35 can be always kept approximately constant. Accordingly, since the magnitude of the friction caused by both surfaces sliding against each other, for example, is always kept approximately constant, there is a reduction in the fluctuation in the attaching/detaching force for the leader pin 8, and as a result it is possible to set a large tolerance for the pressing force of the spring members 9. This means that it becomes easy to machine the spring members 9 so that the manufacturing cost of the spring members 9 and in turn the manufacturing cost of the tape cartridge 1 can be considerably reduced.

Also, by making the contact surfaces 52 curved, when the leader pin 8 is withdrawn or pulled back in, there is point contact between only the central parts of the contact surfaces 52 with the side surfaces 35 of the end parts 32 of the leader pin 8, and upper and lower ends (corner parts) of the contact surfaces 52 are kept separate from the side surfaces 35. Accordingly, even if the leader pin 8 or the spring members 9 becomes tilted during the withdrawal or pulling back in of the leader pin 8 due to a shock, for example, contact between the upper and lower corner parts of the contact surfaces 52 and the side surfaces 35 is very unlikely, so that damage to the side surfaces 35 due to the corner parts sliding on the side surfaces 35 can be prevented.

By forming the spring members 9 of strip-like elastic members, it is possible to suppress bending of the spring members 9 in the width direction (up-down direction), so that fluctuation in the pressing force of the spring members 9 can also be reduced.

Figure 8:
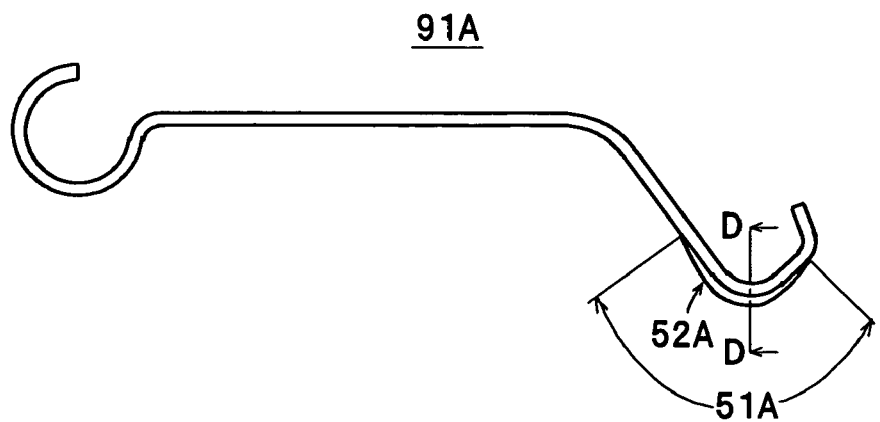
FIG. 8 is a plan view of another spring member.
Figure 9:
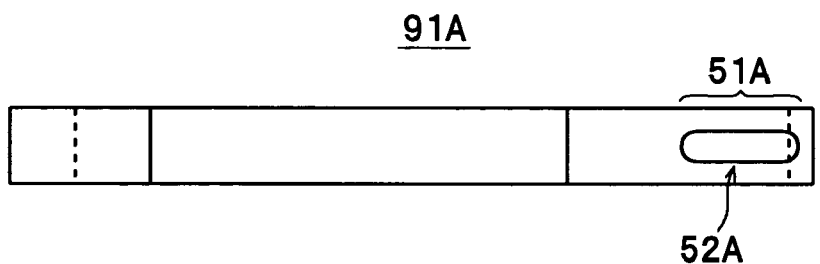
FIG. 9 is a front elevation of another spring member.
Figure 10:
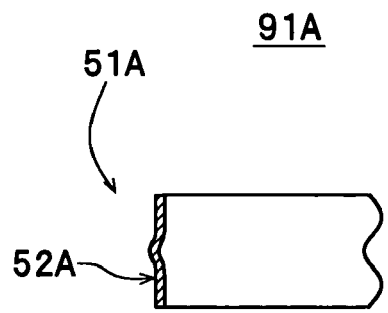
FIG. 10 is a cross-sectional view taken along the line D—D in FIG. 8.
Figure 11:
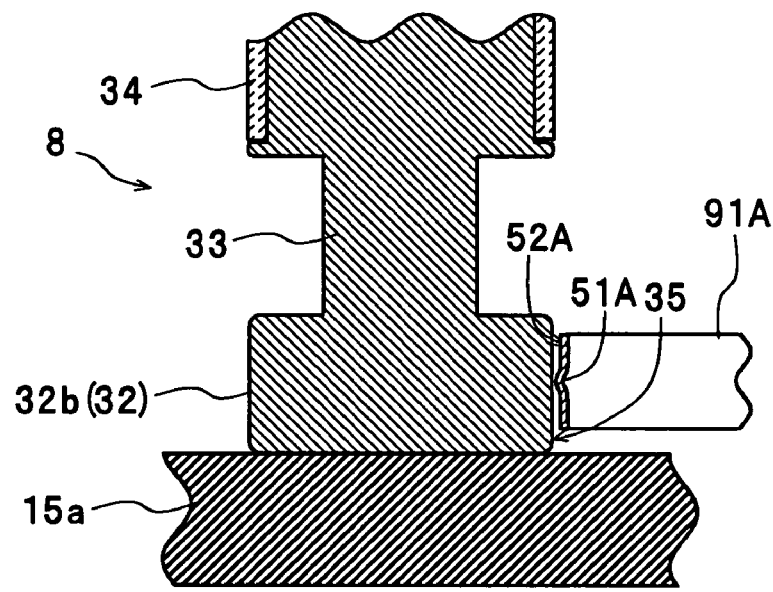
FIG. 11 is a cross-sectional view showing the contact between the leader pin and the other spring members in a state where the lower end surface of the leader pin contacts the base plate.
Figure 12:
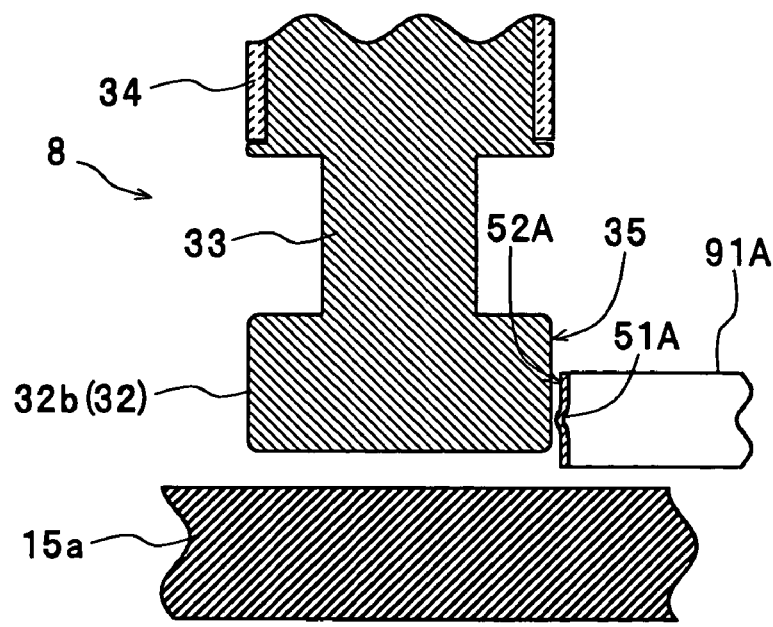
FIG. 12 is a cross-sectional view showing the contact between the leader pin and the other spring members in a state where the lower end surface of the leader pin is separated from the base plate.
Figure 13:
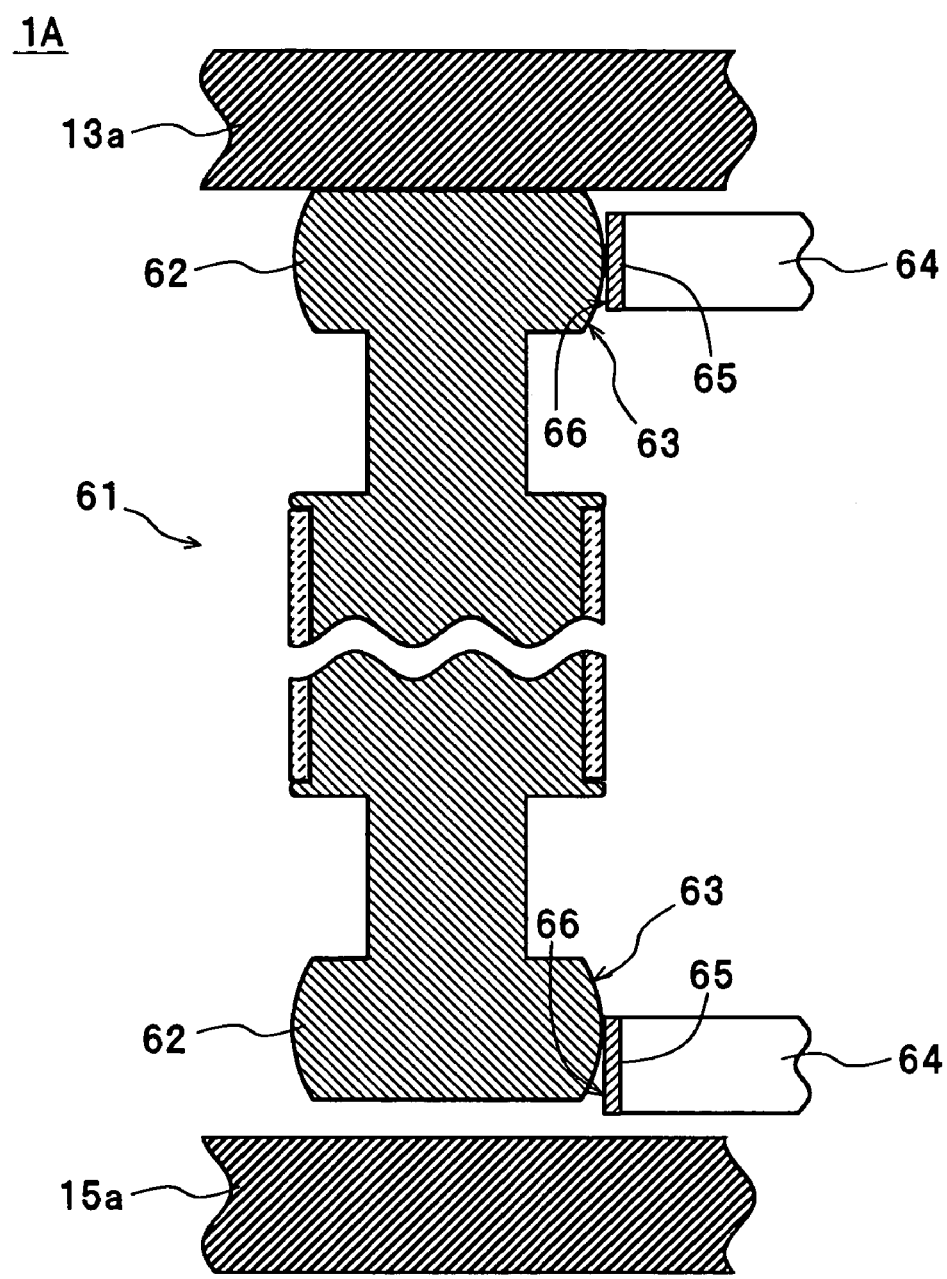
FIG. 13 is a cross-sectional view showing the construction of the leader pin and the spring members in another tape cartridge.

It should be noted that the present invention is not limited to the embodiment described above. For example, although an example of spring members 9 formed so that the entire contact surfaces 52 of the engaging parts 51 are curved has been described as the above embodiment, as shown in FIGS. 8 to 10, it is also possible to use spring members 91A where only the central part in the width direction of contact surfaces 52A of engaging parts 51A are curved. With this construction also, as shown in FIGS. 11, 12, it is possible to ensure that there is always point contact between the side surfaces 35 of the end parts 32 of the leader pin 8 with the central part of the contact surfaces 52A regardless of the position of the leader pin 8 in the up-down direction inside the tape cartridge when the leader pin 8 is withdrawn or pulled back in. Also, as shown in FIG. 13, it is possible to use a tape cartridge 1A with spring members 64 whose engaging parts 65 have flat contact surfaces 66 and a leader pin 61 with end parts 62 whose side surfaces 63 are curved moving towards a central part in an up-down direction of the side surfaces 63 so as to project outwards (towards the contact surfaces 66 of the engaging parts 65 of the spring members 64). With this construction also, it is possible to make the contact surfaces 66 of the spring members 64 contact the projecting parts of the side surfaces 63 of the end parts 62 of the leader pin 61. That is, point contact is always made between the projecting parts of the side surfaces 63 and the contact surfaces 66 of the spring members 64. This means that it is possible to always keep the contact surface area of both surfaces and the contact positions of the side surfaces 63 on the contact surfaces 66 approximately constant. Accordingly, in the same way as the tape cartridge 1, since the magnitude of the friction caused by both surfaces sliding against each other, for example, is always kept approximately constant, there is a reduction in the fluctuation in the attaching/detaching force of the leader pin 61. In this case, the position at which the side surfaces 63 of the end parts 62 project furthest out does not need to be positioned in the center or a central part of the side surfaces 63 in the up-down direction, and can be displaced from the central part in the up-down direction. It is also possible to use a leader pin in whose outer circumference a plurality of projecting parts are formed or a leader pin that has grooves formed in a side surface thereof. Also, in the same way as the spring members 9, the contact surfaces 66 of the spring members 64 can be curved moving towards a central part in the width direction (the up-down direction when the spring members 64 are disposed in the case main body 2) of the contact surfaces 66 so as to project towards the side surfaces 63 of the end parts 62 of the leader pin 61. In this case, the position at which the contact surfaces 66 (or the contact surfaces 52) of the spring members 64 (or the spring members 9) project furthest out does not need to be positioned in the center or a central part of the contact surfaces 66 (or the contact surfaces 52) in the up-down direction, and can be displaced from the central part in the up-down direction. It is also possible to use spring members in whose outer circumference a plurality of projecting parts are formed.

Figure 14:
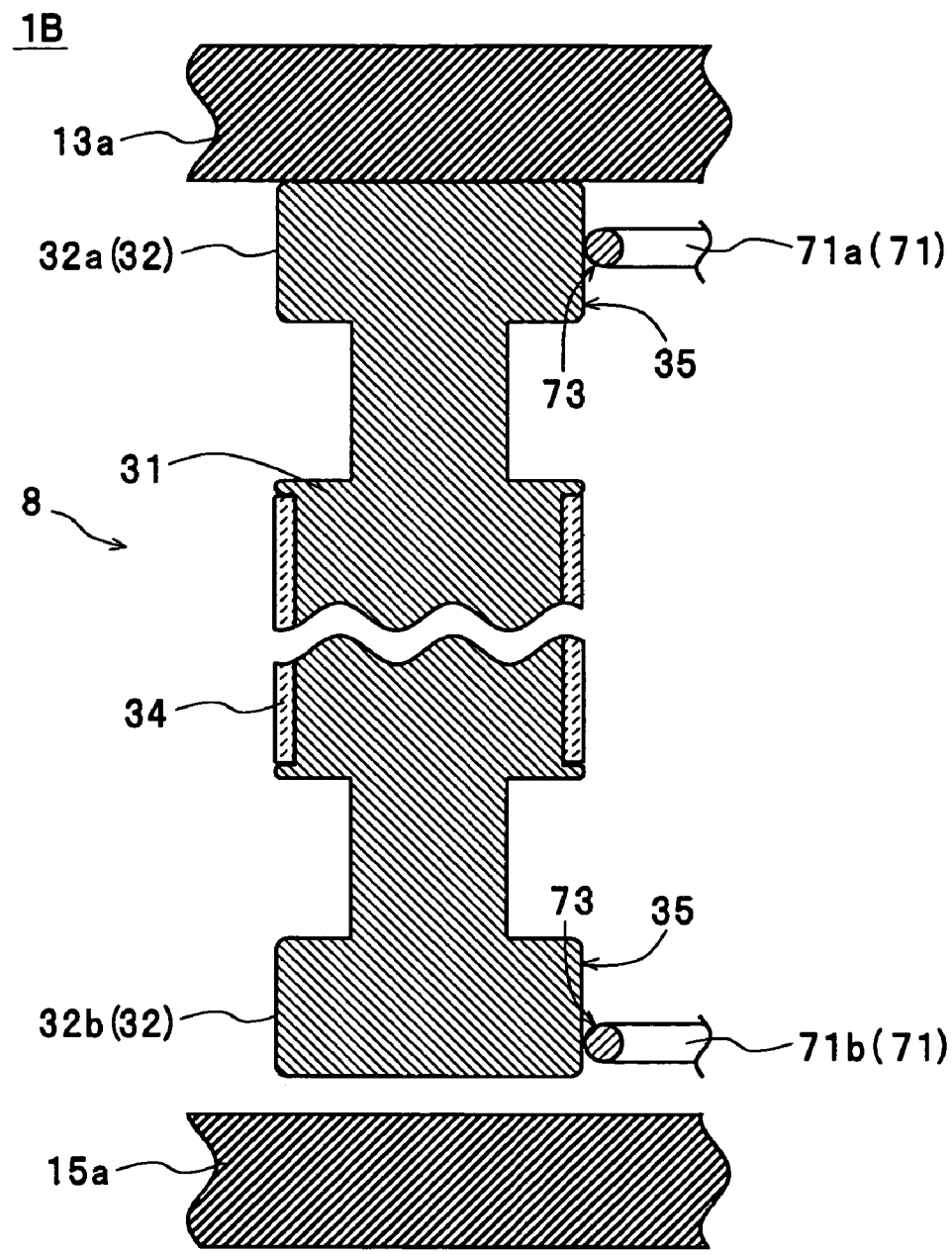
FIG. 14 is a cross-sectional view showing the construction of the leader pin and the spring members in another tape cartridge.
Figure 15:
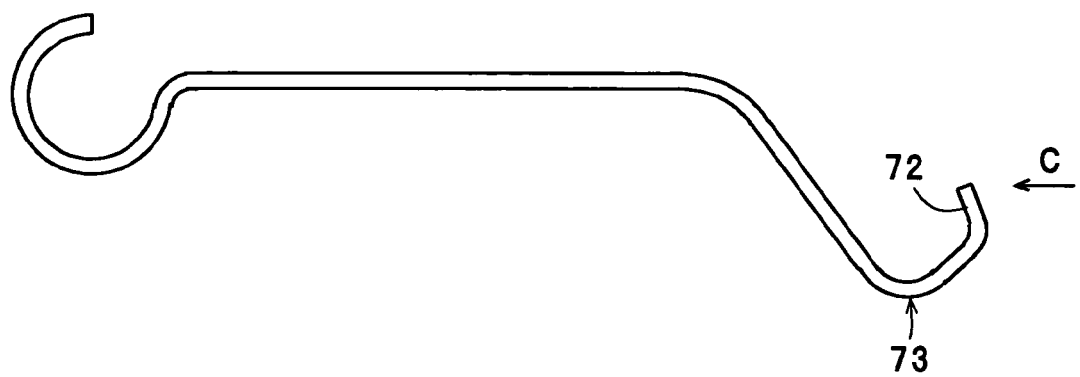
FIG. 15 is a plan view showing the spring members in the tape cartridge shown in FIG. 14.
Figure 16:
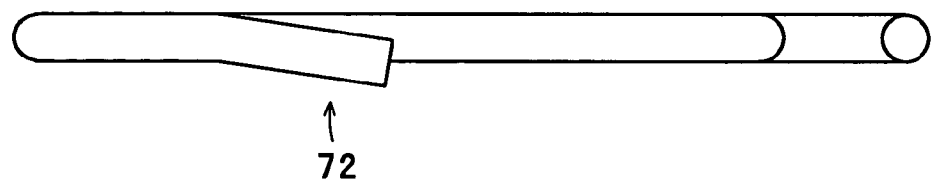
FIG. 16 is a side elevation showing the spring member for the upper case when viewed in a direction of the arrow C in FIG. 15.
Figure 17:
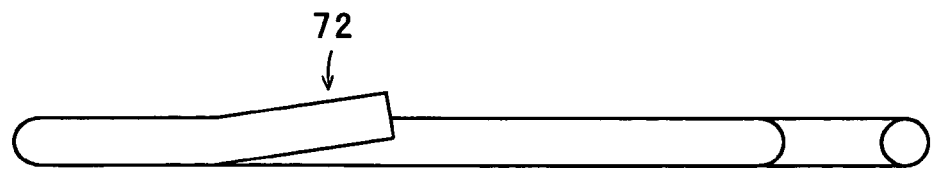
FIG. 17 is a side elevation showing the spring member for the lower case when viewed in a direction of the arrow C in FIG. 15.

Also, although the tape cartridges 1, 1A that include spring members 9 formed of strip-like elastic members have been described in the above embodiment, as shown in FIGS. 14, 15, it is possible to use a tape cartridge 1B equipped with spring members 71a, 71b (hereinafter also referred to as the "spring members 71" when no distinction is required) formed of wire-like elastic members that are circular in cross section in place of the spring members 9. In this case, as shown in FIG. 16, the spring member 71a is formed so that an end part 72 is bent so as to point downwards (i.e., towards the base plate 15a of the lower case 12) when the spring member 71a is disposed, that is, the end part 72 is bent back from the upper case 11. In the same way, as shown in FIG. 17, the spring member 71b is formed so that an end part 72 is bent so as to point upwards (i.e., towards the top plate 13a of the upper case 11) when the spring member 71b is disposed, that is, the end part 72 is bent back from the lower case 12.

According to this tape cartridge 1B, as shown in FIG. 14, the contact surfaces 73 of the spring members 71 always make point contact with the side surfaces 35 of the end parts 32 of the leader pin 8 at the central parts in the width direction of the contact surfaces 73, so that in the same way as the tape cartridges 1, 1A, it is possible to reduce the fluctuation in the attaching/detaching force of the leader pin 8. According to the tape cartridge 1B, the end part 72 of the spring member 71a is bent so as to point downwards and the end part 72 of the spring member 71b is bent so as to point upwards, so that even if the spring members 71 are disposed in a tilted state, for example, the end parts 72 can be kept away from the top plate 13a or the base plate 15a, which means that it is possible to reliably avoid the occurrence of errors due to shavings, which are produced by contact between corner parts of end surfaces of the end parts 72 and the top plate 13a or the base plate 15a, adhering to the magnetic tape. In addition, a bending process for a wire-like elastic member is comparatively easy compared to a bending process for a plate-like elastic member, so that the manufacturing cost of the spring members 71 can be further reduced by a corresponding amount. In this case, it is also possible to form the spring members 71 from a wire-like elastic member that is oval in cross-section instead of the wire-like elastic member that is circular in cross-section.

Figure 18:
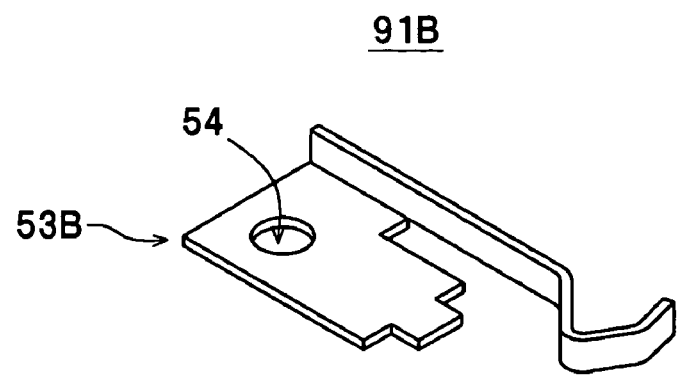
FIG. 18 is a perspective view showing another spring member.
Figure 19:
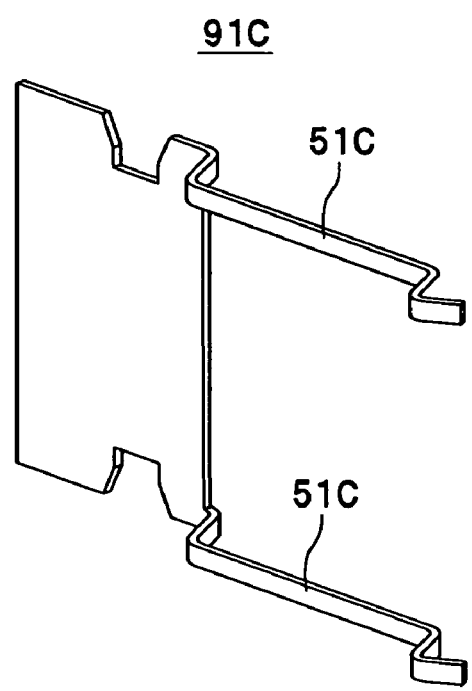
FIG. 19 is a perspective view showing another spring member.
Figure 20:
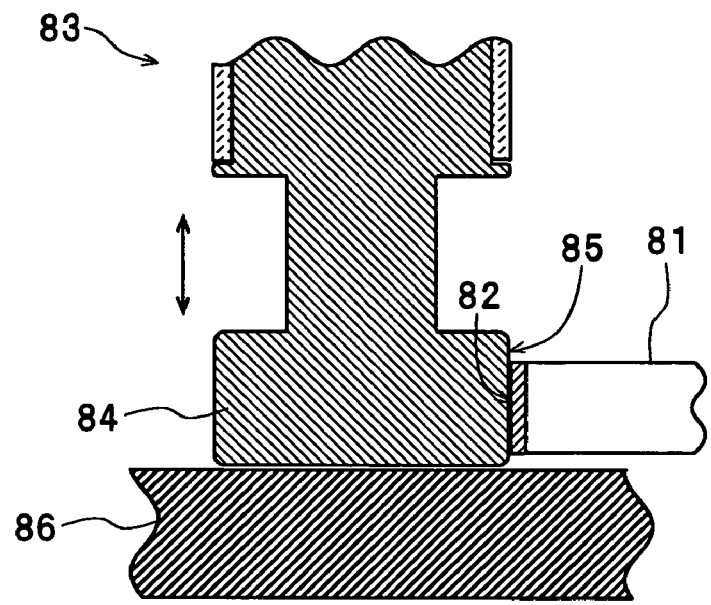
FIG. 20 is a cross-sectional view showing the contact between the leader pin and the spring members in a state where the lower end surface of the leader pin contacts the lower case in a conventional tape cartridge.
Figure 21:
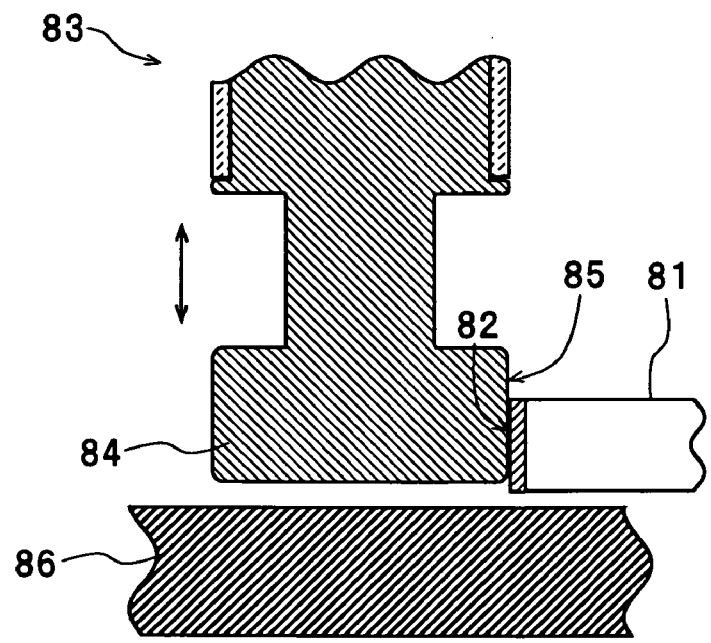
FIG. 21 is a cross-sectional view showing the contact between the leader pin and the spring members in a state where the lower end surface of the leader pin is separated from the lower case in a conventional tape cartridge.

In addition, although examples of spring members 9 with base end parts 53 that are supported by the spring member supporting parts 42a of the upper case 11 (the spring member supporting parts 42b of the lower case 12) are described in the above embodiment of the invention, as shown in FIG. 18 it is also possible to use spring members 91B with plate-like end parts 53B. It should be noted that although only the spring member 91B for the lower case 12 is shown in FIG. 18, a spring member for the upper case 11 is also fabricated by changing the position at which the base end part 53B of the spring member 91B is formed. In this case, the spring member supporting part 42a is fitted onto a hole 54 formed in the base end part 53B and welded (the spring member supporting part 42b is attached in the same way), or the base end part 53B is screwed onto the top plate 13a of the upper case 11 (or the base plate 15a of the lower case 12) using the hole 54 so that the spring member 91B can be reliably fixed to the upper case 11 (or the lower case 12). In addition, although an example including a pair of spring members 9, 9 (or spring members 71, 71) has been described above in the embodiment of the invention, as shown in FIG. 19, a single spring member 91C with a pair of engaging parts 51C, 51C can be used in place of the spring members 9, 9 (or the spring members 71, 71). It is also possible to form the contact surface 52 of the engaging part 51 as a curved surface for only one out of the pair of spring members 9, 9. In addition, it is possible to form only one side surface 63 out of the end parts 62, 62 of the leader pin 61 as a curved surface. Also, although an example where the contact surfaces 52 of the spring members 9 press (contact) the side surfaces 35 of the end parts 32 in the state where the end parts 32 of the leader pin 8 are stored in the leader pin storage parts 41 has been described in the above embodiment, it is not necessary for the contact surfaces 52 to press the side surfaces 35 in this stored state and it is possible to use a construction where a state in which movement is restricted is maintained by having the contact surfaces 52 close to but not contacting the side surfaces 35.

What is claimed is:

1. A tape cartridge comprising:
a single tape reel around which a magnetic tape is wound;
a leader pin that is fixed to an end of the magnetic tape and used to withdraw the magnetic tape;
a case main body that is composed of an upper case and a lower case that fit together, rotatably encloses the tape reel, has a tape withdrawal opening through which the magnetic tape can be withdrawn formed in a side surface thereof, and has leader pin storage parts capable of respectively storing an upper end and a lower end of the leader pin formed in the upper case and the lower case in a vicinity of the tape withdrawal opening; and
a spring member that is disposed in the case main body, regulates movement of the leader pin by having contact surfaces of the spring member contact or be near corresponding side surfaces of the end parts of the leader pin that are stored in the leader pin storage parts, and elastically deforms when the leader pin is withdrawn to stop regulating the movement,
wherein at least one contact surface of the contact surfaces of the spring member is generally plate-shaped and curved towards a central part of the spring member in an up-down direction so as to project towards a respective at least one corresponding side surface of the side surfaces of the end parts of the leader pin.

* * * * *